(12) United States Patent
Falcon (10) Patent No.: US 7,364,610 B2
(45) Date of Patent: Apr. 29, 2008

(54) AIR FILTER SENSOR

(75) Inventor: Michael D. Falcon, 11409 Rockwell Pl., Austin, TX (US) 78726

(73) Assignee: Michael D. Falcon, Austin, TX (US)

( * ) Notice: Subject to any disclaimer, the term of this patent is extended or adjusted under 35 U.S.C. 154(b) by 474 days.

(21) Appl. No.: 11/191,859

(22) Filed: Jul. 28, 2005

(65) Prior Publication Data
US 2007/0022881 A1    Feb. 1, 2007

(51) Int. Cl.
*B01D 39/00* (2006.01)
*B01D 46/00* (2006.01)
*G08B 21/00* (2006.01)
*G01D 11/00* (2006.01)
*G01F 23/00* (2006.01)
*G01L 19/12* (2006.01)
*G04F 1/00* (2006.01)
*G04B 23/02* (2006.01)

(52) U.S. Cl. ............ 96/421; 96/419; 96/424; 116/112; 116/200; 116/109; 116/70; 368/89; 368/97; 368/244

(58) Field of Classification Search ............ 96/419, 96/421, 424; 116/112, 200, 109, 70; 368/89, 368/97, 244
See application file for complete search history.

(56) References Cited
U.S. PATENT DOCUMENTS

| | | | |
|---|---|---|---|
| 2,682,250 A | 6/1954 | Ulrich | |
| 4,066,033 A | 1/1978 | Perry et al. | |
| 4,127,962 A | 12/1978 | Arzola | |
| 4,215,646 A | 8/1980 | Williams | |
| 4,268,285 A | 5/1981 | Mason | |
| 4,321,070 A | 3/1982 | Bede | |
| 4,421,052 A | 12/1983 | Cook | |
| 4,747,364 A | 5/1988 | Horowitz | |
| 4,821,670 A | 4/1989 | Foxcroft et al. | |
| 5,057,821 A | 10/1991 | Card | |
| 5,315,838 A | 5/1994 | Thompson | |
| 5,352,255 A | 10/1994 | Taft | |
| 5,547,636 A | 8/1996 | Vick et al. | |
| 5,647,053 A | 7/1997 | Schroeder et al. | |
| 5,698,166 A | 12/1997 | Vick et al. | |
| 5,909,845 A | 6/1999 | Greatbatch et al. | |
| 6,117,218 A | 9/2000 | Snyder et al. | |
| 6,412,435 B1 | 7/2002 | Timmons, Jr. | |
| 6,514,467 B1 | 2/2003 | Bulsink et al. | |
| 6,699,432 B2 | 3/2004 | Channer | |
| 6,790,408 B2 | 9/2004 | Whitby et al. | |
| 6,837,927 B2 | 1/2005 | David | |

*Primary Examiner*—Walter D. Griffin
*Assistant Examiner*—Amber Miller-Harris (57) ABSTRACT

The present invention is directed towards a sensor including, inter alia, a body having first and second spaced-apart apertures, the first aperture having a shape producing an audible noise upon a fluid passing therethrough; a piston positioned within the body; and a chamber having an additional fluid disposed therein, with a volume of the additional fluid placing the piston between first and second positions, the first position impeding the first volume of fluid and the second position allowing the first volume of fluid to pass through the first aperture.

20 Claims, 10 Drawing Sheets

AIR FILTER SENSOR

BACKGROUND OF THE INVENTION

The present invention is directed towards an audible sensor. More specifically, the present invention is directed towards a sensor for an air filter to indicate a replacement thereof.

Heating and cooling systems for houses and other dwellings and for at least some commercial establishments include a system for transmitting heated or cooled air throughout the dwelling or commercial establishment. These systems for transmitting heated or cooled air also include filtration equipment for removing particulate matter from the heated or cooled air and this filtration equipment, particularly for dwellings, normally includes one or more mechanical filters formed from fibrous materials.

These filter materials serve the function of mechanically blocking particulate matter that is in the air flowing in circuitous paths through the filter material. The particulate matter becomes attached to individual fibers and, over a period of time, progressively restricts the air flow paths. This trapped particulate matter simultaneously causes a reduction of the air flow rate through the filter.

This reduced air flow rate reduces the efficiency of the heating or cooling system and the effective heating or cooling of the dwelling or commercial establishment. The partially clogged filter also causes increased back pressure to be applied to the blower or fan which generates the air flow and this back pressure increases the work that must be performed and the energy consumed by the blower or fan unit. The resulting increased load increases the wear rate of the moving parts in the heating or cooling system and also results in increased operating costs.

In order to determine when an air filter needs to be changed, a person normally must gain access to the filter. The filter must then be removed and visually inspected. If it is evident through this visual inspection that there is a significant build up of particulate matter on the outside surface of the air filter it is usually replaced with a new filter. This procedure has various deficiencies. This procedure means that the air filter must be periodically checked in order to determine when the filter needs to be changed. This is time consuming and can often result in dirty filters not being changed on time due to the failure to remember to check the filter.

U.S. Pat. No. 4,215,646 to Williams describes a whistle audibly responsive to extremely small pressure differentials. The whistle comprises an inlet portion of a first diameter and an outlet portion of a second diameter. The whistle produces an audible sound when a pressure differential exists across the inlet and outlet portions.

U.S. Pat. No. 5,352,255 to Taft describes a noise maker apparatus for an air filter. The noise maker has a housing having a hole and a weighted member in resilient relationship over the hole. The weighted member is responsive to a pressure change across the hole.

However, the replacement of air filters may be a function of time. More specifically, air filters may be replaced based upon a manufacturer's suggested time. To that, there is a need for an improved sensor for air filters.

SUMMARY OF THE INVENTION

The present invention is directed towards a sensor including, inter alia, a body having first and second spaced-apart apertures, the first aperture having a shape producing an audible noise upon a fluid passing therethrough; a piston positioned within the body; and a chamber having an additional fluid disposed therein, with a volume of the additional fluid placing the piston between first and second positions, the first position impeding the first volume of fluid and the second position allowing the first volume of fluid to pass through the first aperture. These and other embodiments are described more fully below.

BRIEF DESCRIPTION OF THE DRAWINGS

FIG. 1 is a perspective view showing a sensor positioned on an air filter in accordance with the present invention;

DETAILED DESCRIPTION OF THE INVENTION

Referring to FIG. 1, there is shown an air filter 10 having a sensor 12, described in further detail below, positioned thereon. Air filter 10 may be any air filter commonly used in a HVAC system (heating, ventilation, and air conditioning system) (not shown) to filter particular matter therefrom. Air filter 10 comprises a frame 14 having a filter material 16 disposed therein. Filter material 16 may include materials including but is not limited to, polyurethane foam and polypropylene. In a further embodiment, sensor 12 may be positioned within frame 14 or within filter material 16.

To that end, air filter 10 may be exposed to a flow of fluid from the HVAC system (not shown). The flow of fluid may have contained therein, inter alia, particulate matter. To that end, air filter 10 filters the flow of fluid such that the particulate matter becomes entangled with and lodged upon filter material 16. However, over a period of time, an increasing quantity of particulate matter becomes entangled with and lodged upon filter material 16 causing detrimental effects upon air filter 10. Such effects include, inter alia, reducing an air flow rate through air filter 10. As a result, an efficiency of the HVAC system is reduced, which is undesirable. To prevent the aforementioned detrimental effects, air filter 10 may be replaced periodically. To that end, described below is a sensor to provide a signal indicating a replacement of air filter 10.

Figure 2:
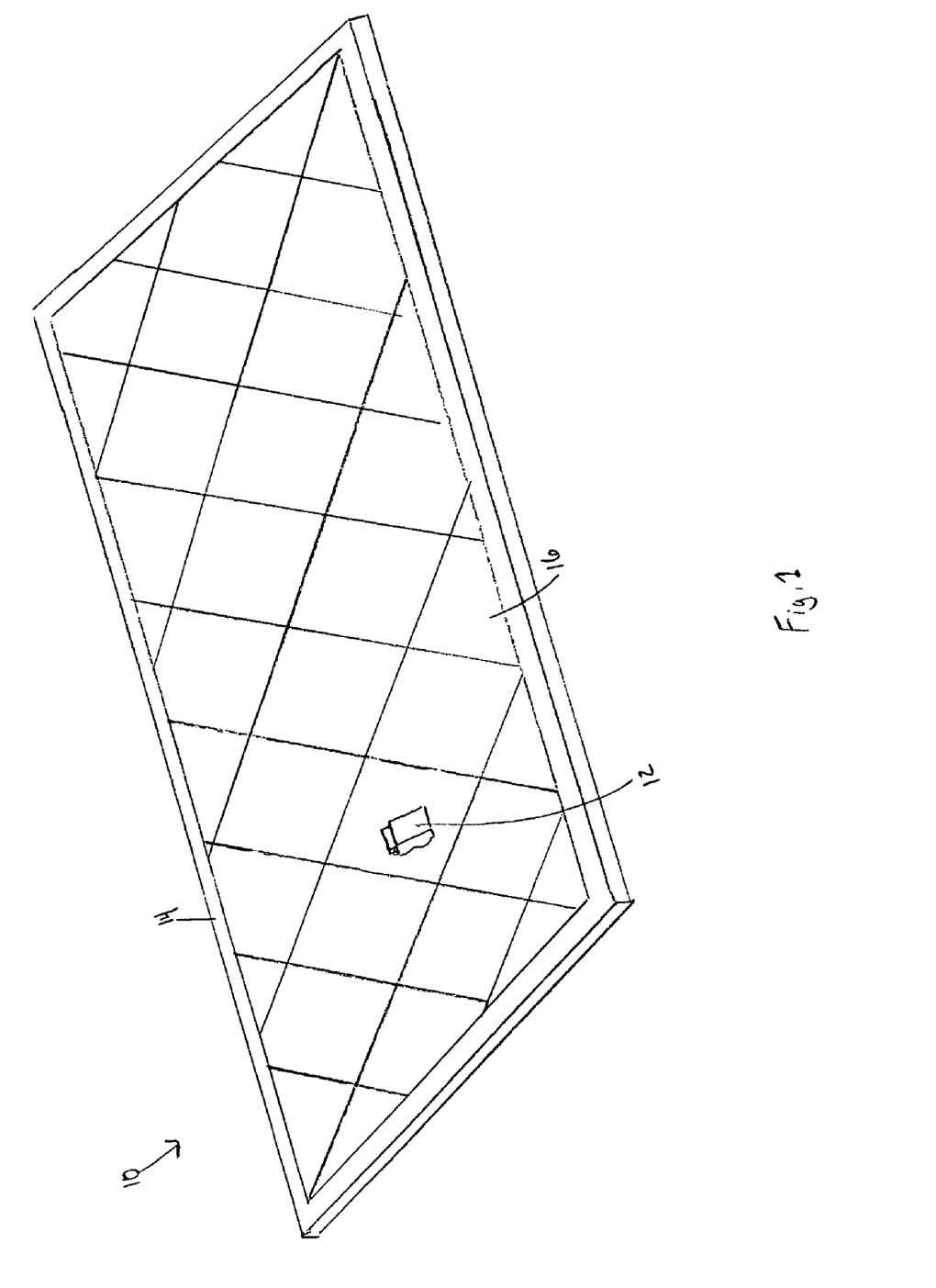
FIG. 2 is a side view of the sensor shown in FIG. 1, in accordance with a first embodiment of the invention, the sensor having a piston placed in a first position.

Referring to FIG. 2, in a first embodiment, sensor 12 comprises a body 18 having a section 20 and spaced-apart first and second ends 22 and 24. In a further embodiment, section 20 may comprise a cavity (not shown) positioned therein. Second end 24 may comprise a protrusion 26. Protrusion 26 facilitates coupling sensor 12 to air filter 10 and more specifically, coupling sensor 12 to filter material 16, shown in FIG. 1. In a further embodiment, second end 24 may comprise a plurality of protrusions 26. In a further embodiment, second end 24 may comprise any coupling element to couple sensor 12 to air filter 10, with such coupling elements including, but is not limited to, pins, barbs, clips, clamps, tape, and adhesives. First end 22 comprises a cavity 28. As shown, cavity 28 comprises a rectangular geometrical shape, however cavity 28 may comprise any desired geometrical shape.

Figure 3:
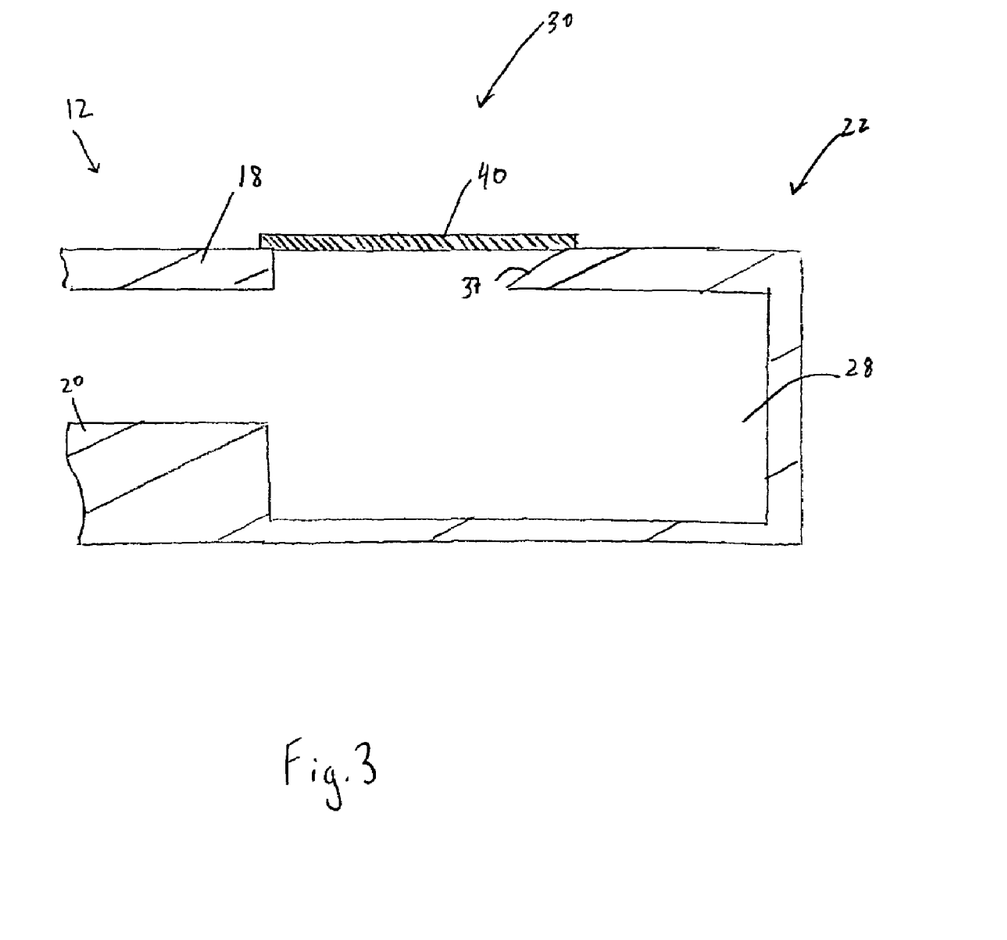
FIG. 3 is a side view of a portion of the sensor shown in FIG. 2, the sensor having a removable portion positioned thereon.

Sensor 12 further comprises apertures 30 and 32 having a pathway 34 extending therebetween. Aperture 30 may be positioned proximate to first end 22 and aperture 32 may be positioned adjacent to second end 24. Pathway 34 may have a fluid 36 flowing therein. Aperture 30 may be in superimposition with cavity 28 and may comprise an angled portion 37. In a further embodiment, aperture 30 may comprise a removable portion 40, shown in FIG. 3, in superimposition therewith. Removable portion 40 may be formed from an adhesive tape.

Figure 4A:
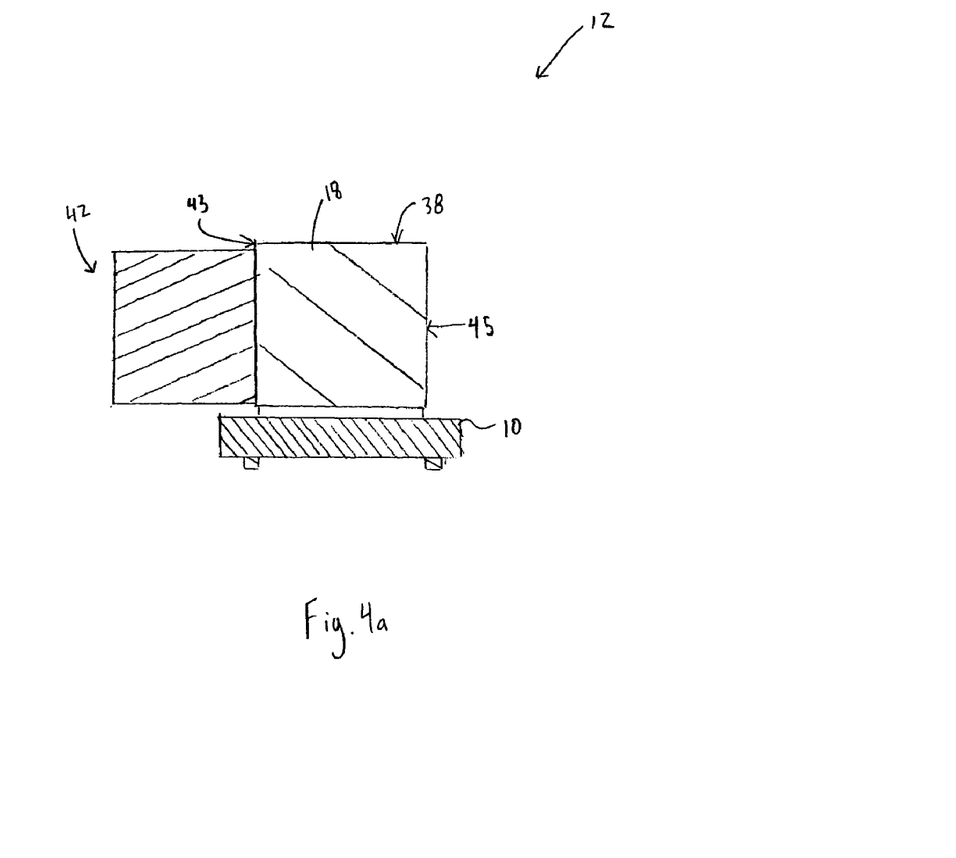
FIG. 4*a* is a front view of the sensor shown in FIG. 2, with a chamber of the sensor positioned on a first side of the sensor.
Figure 4B:
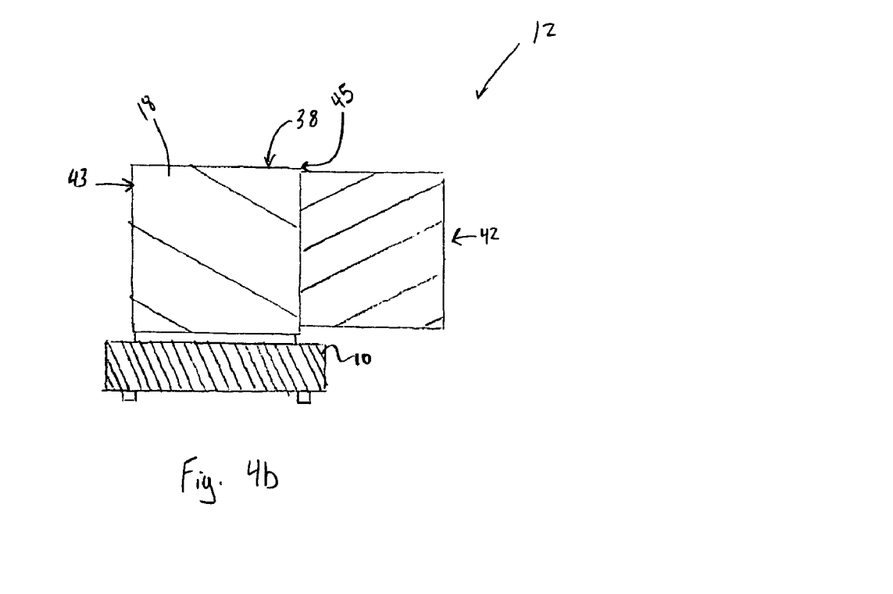
FIG. 4*b* is a front view of the sensor shown in FIG. 2, with a chamber of the sensor positioned on a second side of the sensor.
Figure 5:
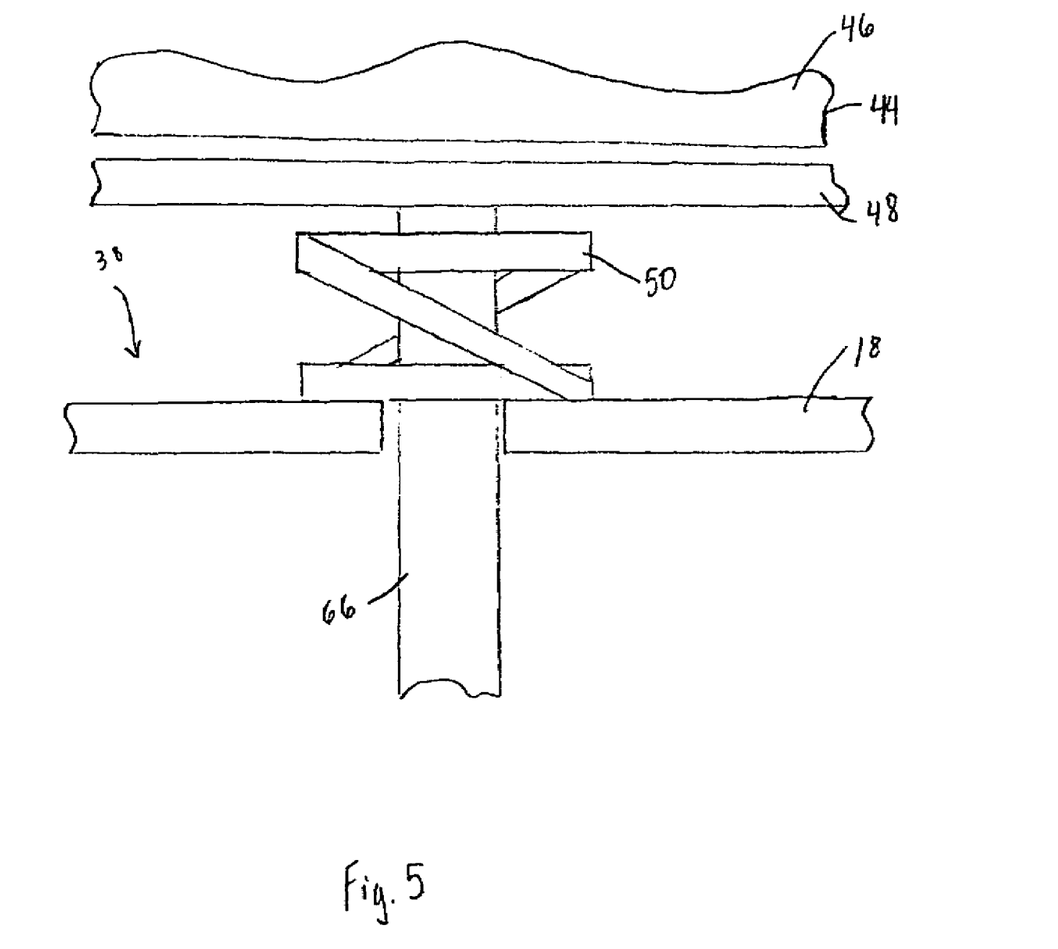
FIG. 5 is a side view of a portion of the sensor shown in FIG. 2, the sensor having a spring.

Positioned upon a side 38 of body 18 is a chamber 42. Chamber 42 may be formed from materials including but not limited to polypropylene, high density polyethylene, glass, ceramic, cardboard, and metal. In a further embodiment, chamber 42 may be positioned upon side 43 of body 18, as shown in FIG. 4a, or upon side 45 of body 18, as shown in FIG. 4b. Chamber 42 may be any desired geometrical shape including but is not limited to, cylindrical and rectangular. Chamber 42 may comprise a bladder 44 having a fluid 46 disposed therein. In a further embodiment, fluid 46 may be disposed within chamber 42 without bladder 44. Positioned between bladder 44 and body 18 is a plate 48. In a further embodiment, a spring 50, shown in FIG. 5, may be positioned between plate 48 and body 18. Spring 50 may exert a force $F_1$ upon plate 48. Force $F_1$ depends upon, inter alia, a spring constant of spring 50. As shown, positioned on a side 52 of chamber 42 is a hole 54 having a wick 56 positioned therein. In a further embodiment, hole 54 and wick 56 may be positioned upon any desired location of chamber 42. Wick 56 may comprise a first segment 58 and a second segment 60, shown more clearly in FIG. 6. First segment 58 may be in contact with fluid 46, and thus place wick 56 in fluid communication with fluid 46. Wick 56 may be formed materials including but is not limited to polyethylene, polypropylene, polyesters, polypropylene, glass-sintered fibers, porous ceramic, carbon fiber, sintered carbon, wood, compressed wood composites, cotton, linen, nylon, polyamides, rayon, and polyacetates.

Positioned within section 20 of body 18 is a aperture 62. Aperture 62 may be in superimposition with chamber 42, and more specifically, in superimposition with an aperture 64 positioned on side 38 of body 18. Attached to plate 48 is a piston 66. As shown, piston 66 comprises a cylindrical shape, however, piston 66 may comprise any geometrical shape desired. In a further embodiment, piston 66 may be contiguous with plate 48. In still a further embodiment, plate 48 may comprise a plurality of pistons 66 attached thereto.

As shown, piston 66 may be placed in a first position. More specifically, piston 66 may be placed to extend thru aperture 64 and pathway 34 to be positioned within aperture 62. Piston 66 may be placed in the first position as a result of a force $F_2$ exerted by fluid 46 upon plate 48. A magnitude of force $F_2$ depends upon, inter alia, a volume of fluid 46. Plate 48 may function to spread force $F_2$ equally about piston 66. To that end, the aforementioned flow of fluid 36 may be impeded as a result of piston 66 being positioned in the first position. More specifically, piston 66 may be placed transverse to the flow of fluid 36.

Figure 6:
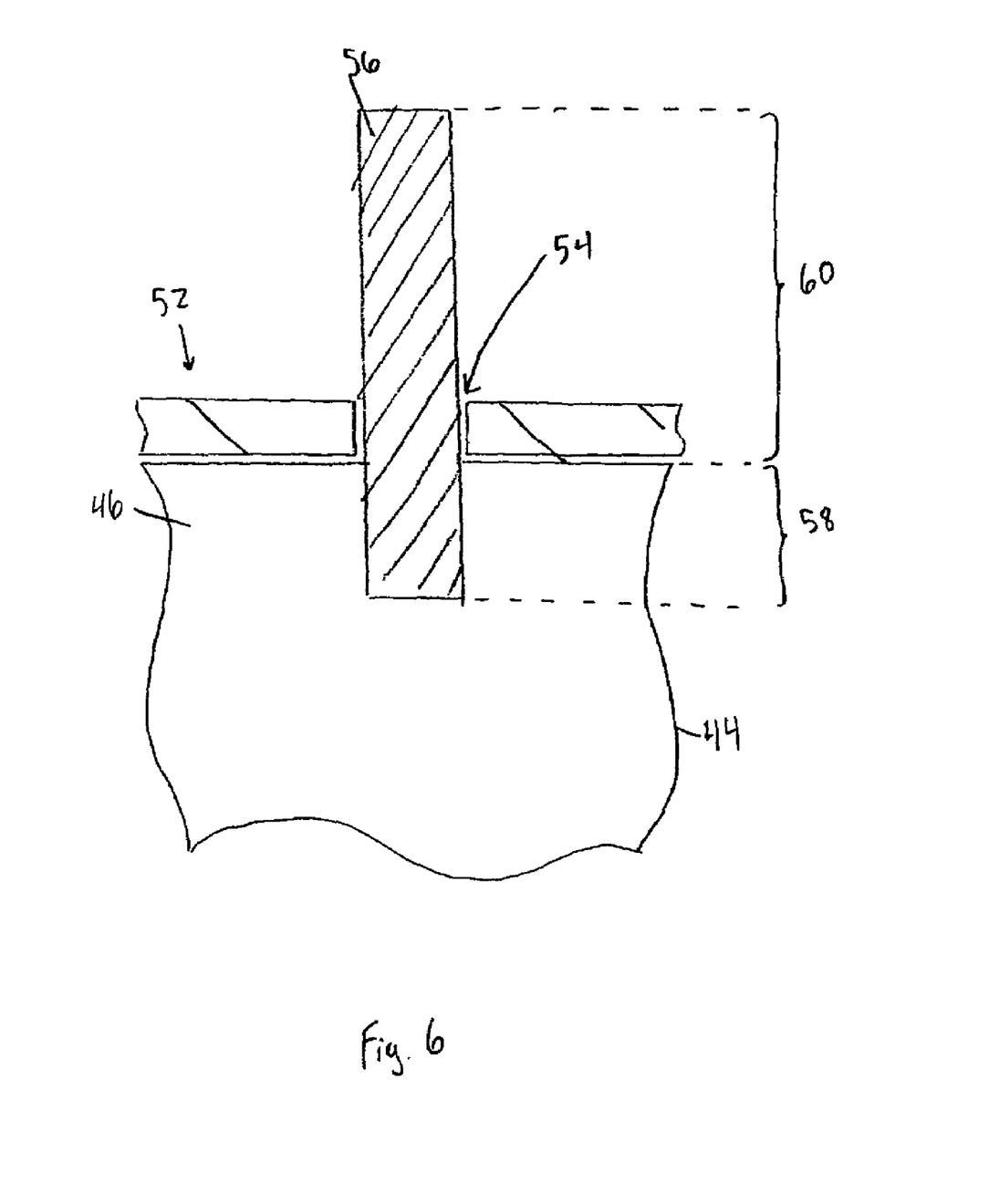
FIG. 6 is an exploded view of a portion of the sensor shown in FIG. 2.

Referring to FIGS. 2 and 6, to that end, fluid 46 may have an evaporation rate associated therewith. The evaporation rate of fluid 46 may depend upon, inter alia, a composition of fluid 46. Fluid 46 may comprise such composition including but not limited to, water, water-based liquids, and oil-based liquids. In a further embodiment, fluid 46 may comprise a fragrant-containing composition. The fragrant-containing composition may be any commercially available fragments such as those available from Save On Scents, Inc. located in Brooklyn, N.Y. In STILL a further embodiment, fluid 46 may comprise a disinfectant-containing composition.

To that end, as mentioned above, fluid 46 may be in fluid communication with wick 56. More specifically, first segment 58 of wick 56 absorbs a portion of fluid 46, with the portion of fluid 46 diffusing into second segment 60 of wick 56. The portion of fluid 46 disposed in second segment 60 may then evaporate into the surrounding environment. This process results in an evaporation/absorption process that continues until bladder 44 may be substantially absent of fluid 46. In a further embodiment, wick 56 may be in electrical communication with a heating source (not shown). The heating source (not shown) may facilitate evaporation of the portion of fluid 46 disposed in second segment 60 of wick 56.

To that end, as a result of a portion of fluid 46 evaporating thru wick 56, a volume of fluid 46 may decrease. As mentioned above, force $F_2$ may be dependent upon the volume of fluid 46. As a result of the decrease in the volume of fluid 46, a magnitude of force $F_2$ upon plate 48 and piston 66 may decrease, and thus, plate 48 and piston 66 may translate towards chamber 42. In a further embodiment, the reduction of the volume of fluid 46 may create a vacuum within chamber 42, and thus facilitate the translation of plate 48 and piston 66 towards chamber 42.

Figure 7:
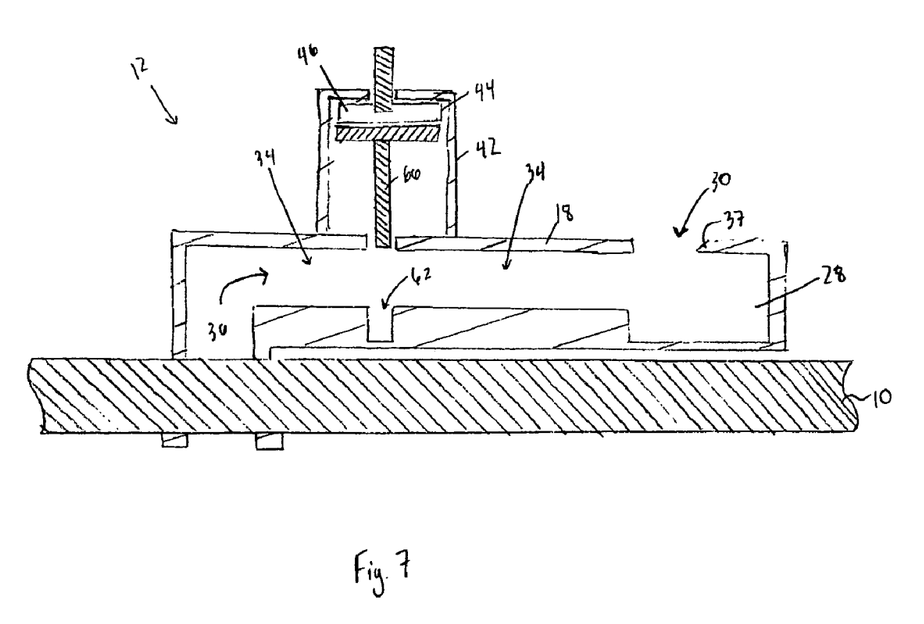
FIG. 7 is a side view of the sensor shown in FIG. 2, with the piston of the sensor placed in a second position.

Referring to FIG. 7, over a predetermined amount of time, a volume of fluid 46 may evaporate such that piston 66 may be placed in a second position. More specifically, piston 66 may be positioned within chamber 42 such that piston 66 does not extend thru pathway 34 and is not positioned within aperture 62. As a result of placing piston 66 in the second position, the flow of fluid 36 may substantially translate through pathway 34 and exit body 18 through aperture 30. As mentioned above, aperture 30 comprises an angled portion 37. To that end, fluid 36 may contact angled portion 37, causing a portion of fluid 36 adjacent to angled portion 37 to vibrate and produce an audible noise, commonly referred to as a "whistle." Furthermore, a geometrical shape of cavity 28 may be altered such that a desired frequency of the audible noise may be obtained and/or to increase a magnitude of the audible noise. In a further embodiment, sensor 12 may comprise a reed whistle (not shown) that may produce the audible noise in response to fluid 36 passing therethrough.

To that end, the aforementioned predetermined amount of time may be dependent upon, inter alia, the evaporation rate of fluid 46. As a result, the composition of fluid 46 may be chosen such that the sensor 12 may produce the aforementioned audible noise after a desired period of time.

Figure 8:
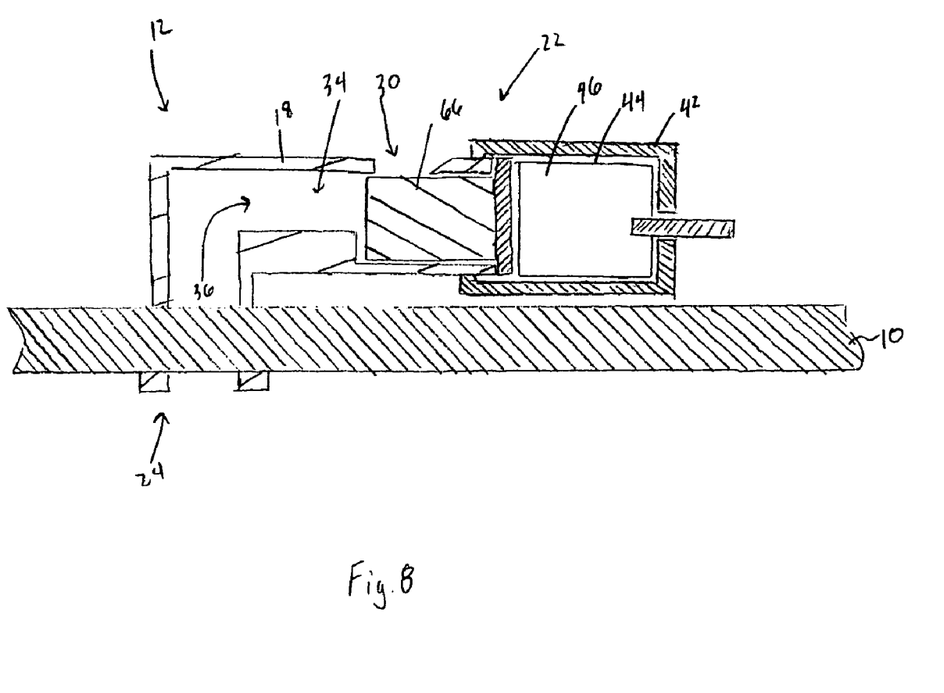
FIG. 8 is a side view of the sensor shown in FIG. 1, in accordance with a second embodiment of the invention, the sensor having a piston placed in a first position.

Referring to FIG. 8, in a second embodiment, piston 66 may be positioned adjacent to first end 22 of body 18. As a result, when piston 66 is placed in the first position, piston 66 may substantially be in superimposition with aperture 30, and thus, impede a flow of fluid 36 thru pathway 34.

Figure 9:
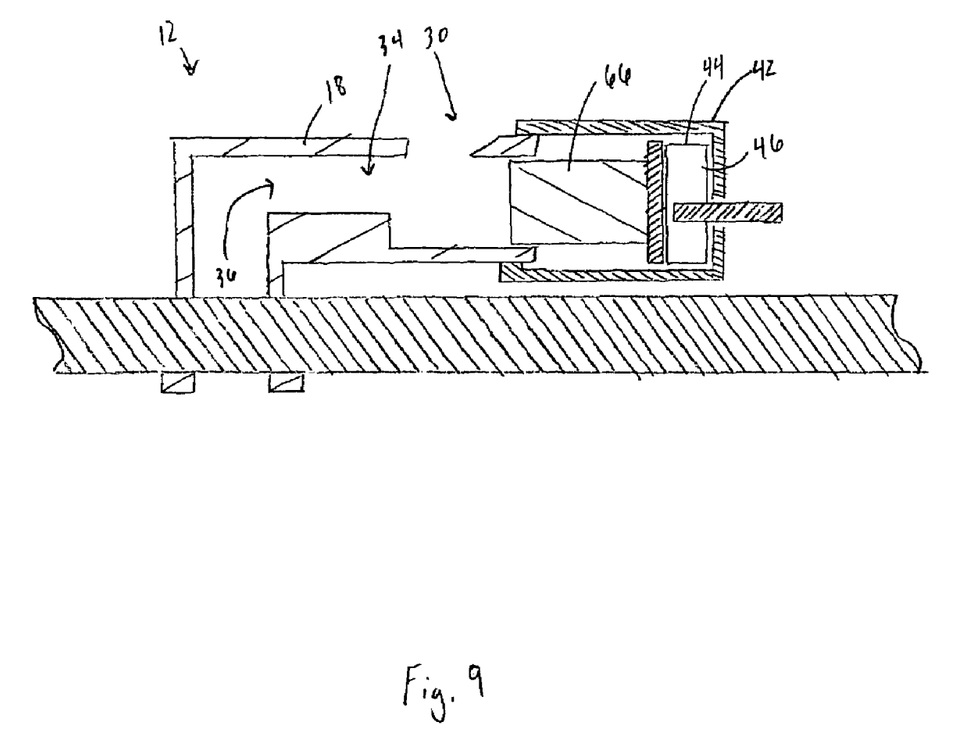
FIG. 9 is a side view of the sensor shown in FIG. 2, with the piston of the sensor placed in a second position.

Referring to FIG. 9, analogously to the above-mentioned, piston 66 may be placed in the second position as a result of a decreasing volume of fluid 46, and thus, expose aperture 30. Fluid 36 may then flow through pathway 34 to exit through aperture 30 and produce the audible noise, analogous to the above-mentioned.

Figure 10:
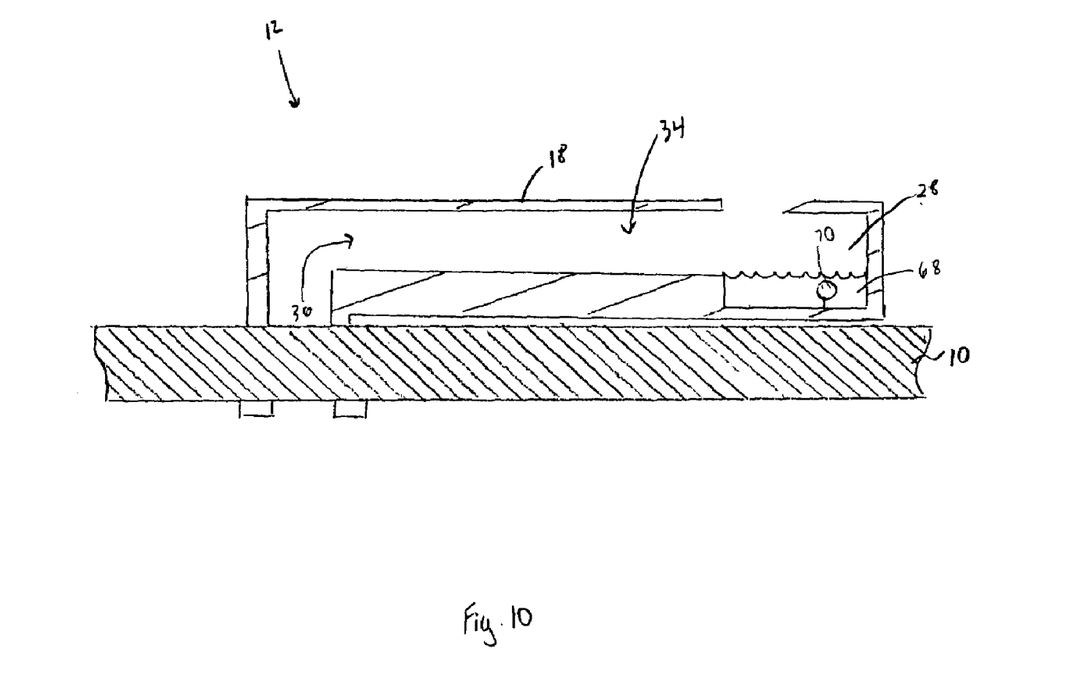
FIG. 10 is a side view of the sensor shown in FIG. 1 in accordance with a third embodiment of the invention.

Referring to FIG. 10, in a further embodiment, cavity 28 may comprise a fluid 68. Fluid 68 may have an evaporation rate associated therewith. The evaporation rate of fluid 68 may depend upon, inter alia, a composition of fluid 68. Fluid 68 may comprise such compositions as those mentioned-above with respect to fluid 46, shown in FIG. 2. Cavity 28 may further comprise a noise-making device 70 positioned therein. To that end, analogous to fluid 46 mentioned above with respect to FIG. 2, over a predetermined period of time, a volume of fluid 68 may evaporate, and thus, fluid 68 may be substantially absent from cavity 28. To that end, fluid 36 may flow thru pathway 34 and contact noise-making device 70 such that noise-making device 70 may produce an audible noise. Noise-making device 70 may comprise a bell, a chime, or a rattle. Further, the composition of liquid 68 may be chosen such that the sensor 12 may produce the aforementioned audible noise after a desired time.

The embodiments of the present invention described above are exemplary. Many changes and modifications may be made to the disclosure recited above, while remaining within the scope of the invention. Therefore, the scope of the invention should be determined not with reference to the above description, but instead should be determined with reference to the appended claims along with their full scope of equivalents.

What is claimed is:

1. A sensor comprising:
   a body having first and second spaced-apart apertures, said first aperture having a shape producing an audible noise upon a fluid passing therethrough;
   a piston positioned within said body; and
   a chamber having an additional fluid disposed therein, with a volume of said additional fluid placing said piston between first and second positions, said first position impeding said first volume of fluid and said second position allowing said first volume of fluid to pass through said first aperture.

2. The sensor as recited in claim 1 wherein a composition of said additional fluid is selected such that said fluid has a predetermined evaporation rate associated therewith.

3. The sensor as recited in claim 1 wherein said volume of said additional fluid exerts a force on said piston to place said piston between said first and second positions.

4. The sensor as recited in claim 2 wherein said volume of said additional fluid exerts a force on said piston to place said piston between said first and second positions, with said force being a function of said evaporation rate.

5. The sensor as recited in claim 1 wherein said sensor further includes a plate attached to said position with a spring positioned between said chamber and said plate.

6. The sensor as recited in claim 1 further including a removable segment positioned over said first aperture.

7. The sensor as recited in claim 1 wherein said additional fluid has a composition selected from a group of compositions including fragrant, disinfectant, and a combination thereof.

8. The sensor as recited in claim 1 wherein said piston is positioned transverse to a flow of said fluid.

9. The sensor as recited in claim 1 wherein said piston covers said first aperture when placed in said second position.

10. The sensor as recited in claim 1 further including a wick in fluid communication with said chamber.

11. A sensor comprising:
    a body having a cavity and first and second spaced-apart apertures, said first aperture positioned proximate to said cavity and having a shape to produce an audible noise upon a fluid passing therethrough;
    a chamber having an additional fluid disposed therein, with a volume of said additional fluid placing a piston between first and second positions, said first position covering said first aperture and said second position allowing said first volume of fluid to pass through said first aperture.

12. The sensor as recited in claim 11 wherein a composition of said additional fluid is selected such that said fluid has a predetermined evaporation rate associated therewith.

13. The sensor as recited in claim 11 wherein said volume of said additional fluid exerts a force on said piston to place said piston between said first and second positions.

14. The sensor as recited in claim 13 wherein said volume of said additional fluid exerts a force on said piston to place said piston between said first and second positions, with said force being a function of said evaporation rate.

15. The sensor as recited in claim 11 wherein said sensor further includes a plate attached to said position with a spring positioned between said chamber and said plate.

16. The sensor as recited in claim 11 further including a wick in fluid communication with said chamber.

17. A sensor for an air filter to signal a predetermined replacement time thereof, said sensor comprising:
    a body having spaced-apart first and second ends, said first end having a first aperture and said second end having a second aperture, said first end attached to said air filter to place said first aperture in fluid communication with a flow of fluid, said second aperture having a shape to produce an audible noise upon said flow of said fluid passing therethrough;
    a piston positioned in said body; and
    a chamber having an additional fluid positioned therein, with a volume of said fluid exerting a force upon said piston to place said piston between first and second positions, said first position impeding said first volume of fluid and said second position allowing said first volume of fluid to pass through said first aperture.

18. The sensor as recited in claim 17 wherein a composition of said additional fluid is selected such that said fluid has a predetermined evaporation rate associated therewith, with said force being a function of said evaporation rate.

19. The sensor as recited in claim 17 wherein said sensor further includes a plate attached to said position with a spring positioned between said chamber and said plate.

20. The sensor as recited in claim 17 further including a wick in fluid communication with said chamber.

* * * * *